US006332948B1

(12) United States Patent
Lafond

(10) Patent No.: US 6,332,948 B1
(45) Date of Patent: Dec. 25, 2001

(54) APPARATUS AND METHOD FOR SEALING INSULATED GLASS UNITS

(76) Inventor: Luc Lafond, 23 Woodvalley Dr., Etobicoke (CA), M9A 4H4

( * ) Notice: Subject to any disclaimer, the term of this patent is extended or adjusted under 35 U.S.C. 154(b) by 0 days.

(21) Appl. No.: 09/433,343

(22) Filed: Nov. 4, 1999

(30) Foreign Application Priority Data

Nov. 5, 1998 (CA) ........................................ 2253012

(51) Int. Cl.[7] ........................................ C03C 27/12
(52) U.S. Cl. .................... 156/379.9; 156/538; 156/583.1
(58) Field of Search .................... 156/99, 106, 109, 156/379.6, 379.9, 380.9, 499, 538, 539, 580, 583.1

(56) References Cited

U.S. PATENT DOCUMENTS 4,110,148 * 8/1978 Rocholl ........................ 156/359
4,683,154 7/1987 Benson et al. .................. 428/34
4,950,344 * 8/1990 Glover et al. .................. 156/109
5,567,258 10/1996 Lee et al. ..................... 156/109

FOREIGN PATENT DOCUMENTS 0 061 183 9/1982 (EP) .

* cited by examiner

*Primary Examiner*—Steven D. Maki
*Assistant Examiner*—John T. Haran
(74) *Attorney, Agent, or Firm*—McFadden, Fincham

(57) ABSTRACT

An apparatus and method to seal a spacer between a pair of substrates within an IG assembly having a pair of spaced apart substrates and a bondable spacer therebetween, having support means for supporting an IG assembly to be treated and zonal energy applying means to locally apply energy to selected zones of the IG assembly where said spacer is located without providing direct energy to the balance of the IG assembly.

4 Claims, 12 Drawing Sheets

APPARATUS AND METHOD FOR SEALING INSULATED GLASS UNITS

FIELD OF THE INVENTION

The present invention relates to the fabrication of insulated glass ("IG") units. In particular, the present invention relates to an apparatus and method of sealing a spacer between a pair of spaced apart substrates.

BACKGROUND OF THE INVENTION

In the conventional manufacture of sealed insulated units comprising an assembly of two spaced apart parallel sheets of substrate (usually glass) and a bondable and/or curable spacer therebetween, assembled units are positioned in a press and the entire unit is heated to melt and/or cure the spacer allowing the spacer to bond to the substrates. Heating of the entire unit causes problems since it increases the temperature of the entire unit including the air between the substrates. In addition, if the entire unit is being heated in the vertical position, a "chimney" effect occurs whereby the upper zone of the unit may become overheated relative to the lower zone with problems resulting.

For example, in U.S. Pat. No. 5,567,258, an IG unit containing an aluminum spacer, aluminum tape corner keys and a thermoset resin sealant is placed within a tunnel having microwave generators on each side. The unit passes through the tunnel and the entire IG unit is subjected to microwave energy to bond the spacer to the substrates. Conventional presses ensure that the spacer is firmly bonded to the substrates. The entire spacer however, is heated which can result in softening of the spacer and changes in the shape of the spacer.

U.S. Pat. No. 4,683,154 discloses a window panel held in a spaced apart manner by glass beads and sealed by welded glass obtained by welding the bead spacers together with a laser beam while positioned in a vacuum furnace. The laser welding occurs while the IG unit is in the furnace and is directed around the perimeter of the IG unit by a combination of rotating the IG unit and aiming the laser with mirrors.

Drawbacks of the conventional art include higher energy consumption, higher heat dissipation requirement, increased fabrication time and overheating of the IG assembly and spacer. It is an object of the present invention to overcome the disadvantages of the prior art by using localized zonal heating or other energy source to heat or otherwise induce an effect (e.g. for curing) within the spacer of the IG assembly in the zone(s) of the assembly where the spacer is positioned between the substrates.

SUMMARY OF THE INVENTION

In accordance with the present invention, there is provided an improved apparatus to seal a spacer between a pair of spaced apart substrates, wherein thermal or other energy is applied locally to selected zones of the assembly where the spacer contacts the substrates.

According to another aspect of the present invention, there is provided in the above type of apparatus a press adapted to provide sealing between a pair of spaced part substrates (conveniently glass) and a bondable spacer, including heat sources adapted to move with glass substrates, specifically movably positioned to heat the edges of the glass substrates or IG unit.

According to another aspect of the present invention, there is provided in the above type of apparatus a vertical press adapted to provide sealing between a pair of spaced apart glass substrates in generally vertical orientation and a bondable spacer, including guide roller means.

According to yet another aspect of the present invention, multiple localized energy applicator heads, preferably one per side of the IG unit are employed.

In a still further aspect of the present invention, there is provided in the above type of apparatus a vertical glass press adapted to provide sealing between a pair of spaced apart glass substrates and a bondable spacer, having at least one heating means synchronized to travel a desired distance with the leading edge of a glass substrate. The apparatus may further include a second heating means synchronized to travel a desired distance with the trailing edge of a glass substrate.

According to another aspect of the invention, there is provided in the above type of apparatus a glass press adapted to provide sealing between a pair of spaced apart glass substrates and a bondable spacer, comprising a plurality of spaced-apart compression means such as rollers or ball bearings between which a glass assembly is adapted to pass whereby said rollers apply compressive force to the spaced apart glass substrates, means for advancing a glass assembly to and through said apparatus, a plurality of spaced apart heating means adapted to provide localized heating to said spacer in selected areas of said glass assembly where said spacer is located and without providing direct heat to the balance of said glass assembly.

According to a further aspect of the invention, there is provided in the above type of apparatus a preferred heating means comprising two pairs of spaced-apart heating assemblies, at least one pair of said spaced apart heating assemblies comprising at least one adjustable heater adapted to move in a generally parallel direction relative to the other heater of said one pair.

According to a still further aspect of the invention there is provided in the above type of apparatus wherein said heating assembly includes a first pair of spaced apart heaters, one of said heaters being mounted in a fixed relationship to said press and the other of said heaters of said one pair being movable in a generally parallel relationship to said fixed heater, and means for effecting movement of said one movable heater.

According to an aspect of the present invention there is provided in the above type of apparatus wherein the other of said pair of heaters comprises at least one movable heater movable in a second direction relative to the direction of movement of said first pair of heaters, and means for effecting movement of the movable heater of said second pair of heaters.

In another aspect of the present invention there is provided a method of sealing an insulated assembly having a pair of spaced apart substrates and a spacer therebetween, comprising;

(a) providing an insulated assembly, (b) providing an energy source, (c) selectively applying energy to selected zones of said assembly where said spacer is located without providing direct energy to the balance of the assembly.

In still another aspect of the present invention there is provided a method of sealing an insulated assembly having a pair of spaced apart substrates and a spacer therebetween, comprising selectively applying energy to selected zones of said assembly where said spacer is located without providing direct energy to the balance of the assembly.

According to a further aspect of the present invention there is provided in the above type of apparatus wherein there is provided two pairs of heater assemblies each pair being mounted in an angular relationship to the other pair of heaters, each heater means comprising an individual heater adapted to direct a heat source to a selected portion of a glass assembly containing a spacer element.

According to another aspect of the present invention there is provided a method of bonding a spacer to a pair of spaced apart glass substrates in which the spacer is positioned between the substrates; the method includes the steps of providing a glass assembly having a spacer between a pair of spaced apart glass substrates and in which the glass substrates of the assembly are loosely bonded by said spacer, providing a plurality of heat sources of an elongated relatively narrow width compared to the overall surface area of the glass assembly, positioning said plurality of heat sources in operative relationship to a glass surface beneath which the elongated spacer is located and selectively applying heat to said spacer along an elongated narrow strip of the glass assembly whereby the spacer is preferentially heated relative to other areas of the glass assembly.

In accordance with one aspect of the present invention, there is provided in the above type of apparatus a vertical press adapted to provide sealing between a pair of substrates and a bondable spacer material, having heat means adapted to provide heat to a specific area of a substrate to bond a material enclosed within said pair of substrates.

Having thus generally described the invention, reference will now be made to the accompanying drawings illustrating preferred embodiments and in which:

DETAILED DESCRIPTION OF THE PREFERRED EMBODIMENTS

The terms "height" and "width" when used herein in reference to the IG assemblies refers to the IG assembly positioned generally vertically. The term "thickness" refers to the transverse axis across the substrates. "Left" and "right" are in reference to a viewer at the leading edge of the apparatus viewing the assembly along the axis of travel of the IG assembly being treated. IG assembly includes assemblies having substrates of glass or other suitable material such as plastic or aluminum.

Figure 1:
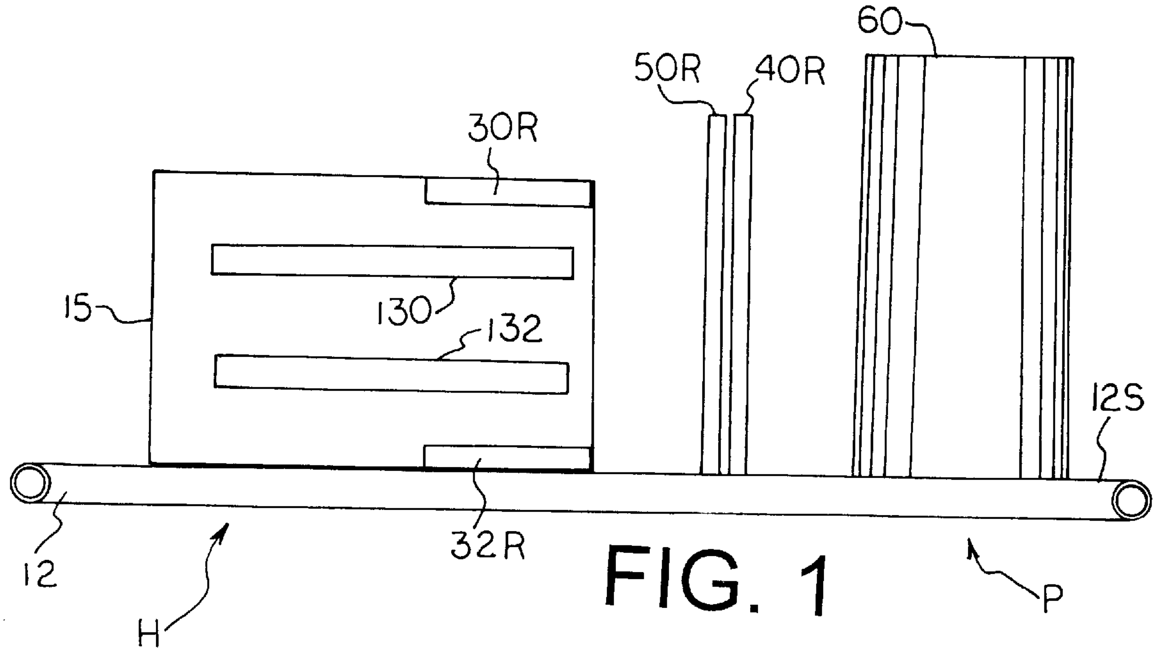
FIG. 1 is a front view of the apparatus in accordance with the present invention.
Figure 2:
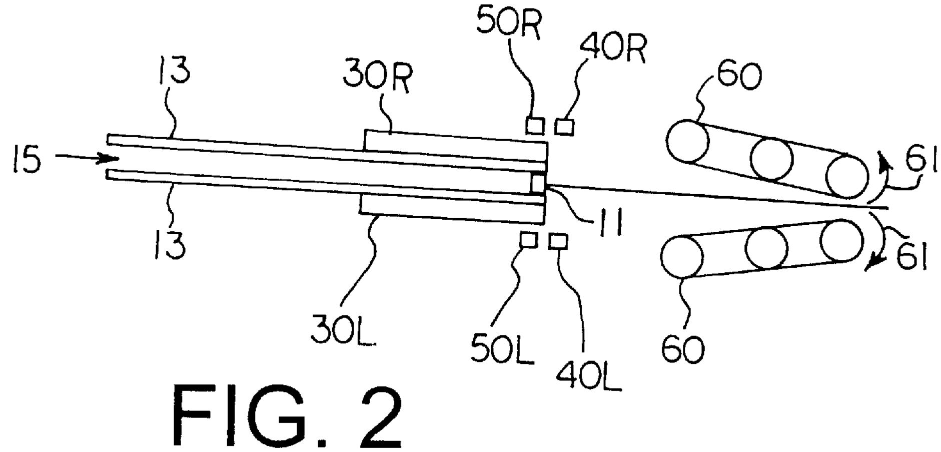
FIG. 2 is a top view of the compression rollers of the apparatus illustrated in FIG. 1.
Figure 3:
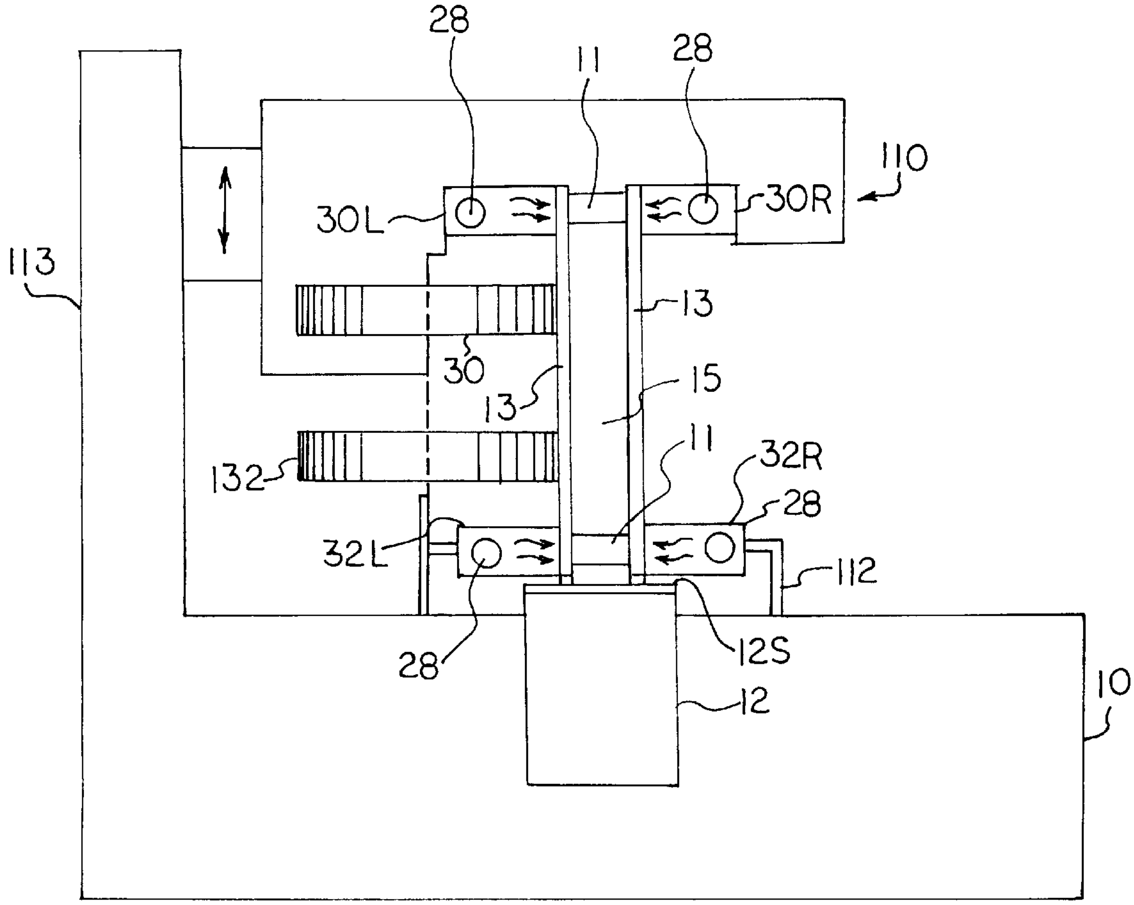
FIG. 3 is an end view of the apparatus illustrated in FIG. 1.

Referring to FIGS. 1 to 3, the press apparatus includes an energy applying station in the form of a heating station indicated generally by H and a pressing station indicated generally by P. The press apparatus is designed to be part of a conventional continuous production line process for the manufacture of IG units but alternatively may be used as a stand-alone unit as well. Advancing means in the form of a conveyor 12 mounted in a base 10 links stations H and P.

An IG unit 15 to be treated is conveyed by the conveyor 12 sequentially to stations H and P in a nearly vertical position with the substrates 13 of the IG unit 15 being generally vertical with respect to the conveying surface 125 of the conveyor 12. It will be understood, however, by those skilled in the art that the present invention may be used to treat units conveyed to the press apparatus in the horizontal position.

The conveying surface 125 is inclined preferably approximately 5 degrees with respect to the horizontal such that the IG unit 15 to be treated tilts to one side of the conveyor 12. The conveyor 12 may be controlled by suitable timing means to move an IG unit 15 as desired between the stations H and P.

The heating station H includes upper and lower assemblies indicated generally by 110 and 112. The lower assembly 112 is mounted on the base 10 and houses lower left and right horizontal heater housings 32L and 32R and guide roller 132. The housings 32L and 32R further house a plurality of linearly mounted heater means 28. The horizontal heater housings 32L and 32R are movably housed within the assembly 112 by suitable means such that the separation between the housings 32L and 32R can be altered to accommodate IG units 15 of various thicknesses. The horizontal position of the lower assembly 112 is fixed but can be made adjustable by suitable means if needed.

The upper assembly 110 is mounted to support 113 which includes height adjustment means to adjust the spacing between the upper and lower assemblies 110 and 112, thus permitting the press apparatus to accommodate IG assemblies of various sizes. The upper assembly 112 includes left and right spaced apart upper horizontal heater housings 30L and 30R and a single guide roller 130. The housings 30L and 30R further house a plurality of linearly mounted heater means 28. The horizontal heater housings 30L and 30R are movably housed within the assembly 110 by suitable means such that the separation between the housings 30L and 30R can be altered to accommodate IG units 15 of various thicknesses.

Guide roller 130 is movable with the housing 30L. The guide rollers 130 and 132 support the IG assembly while in the station H. Additional guide rollers may be used if needed.

The heating station H further includes left and right leading and trailing vertical heater housings 40L, 40R and 50L, 50R respectively. The vertical heater housings 40L, 40R and 50L, 50R are tilted by an amount equivalent with the incline of the conveying surface 125 and each further house a plurality of linearly mounted heater means 28. The heater means 28 are any suitable means such as electric, gas known in the art e.g. heat lamps and the housings 30L,30R, 32L,32R, 40L,40R and 50L,50R are constructed of suitably heat resistant materials such as aluminum. Means are provided to selectively activate and deactivate the heater means 28 when desired.

Leading vertical housings 40L,40R are movably mounted on the base 10 to move with the leading edge of the IG unit 15 between a home position, when an IG unit 15 first enters station H, and an end position at the end of the heating cycle. Trailing vertical housings 50L,50R move between like positions with the trailing edge of the IG unit 15. The travel distance of the vertical housings 40L,40R and 50L,50R with the IG unit is determined by the desired heating time and can be varied as will be appreciated by those skilled in the art.

The housings 30L, 30R, 32L, 32R, 40L,40R and 50L,50R are designed to focus heat from the heater means 28 on the zones of the IG assembly where the spacer 11 is positioned and to reduce or eliminate heating of the balance of the IG assembly. The area of the heated zone corresponds approximately with the area of contact of the spacer 11 with the substrate 13.

The pressing station P includes pressing means in the form of two converging press belts 60 having a wider separation at the beginning of the station P than at the end to provide a progressively decreasing passage channel through which an IG unit 15 will pass. The starting and ending separation of the belts 60 will be commensurate with the thickness of the IG unit 15 and the belts 60 can be optionally mounted on the base 10 such that the separation between the belts is adjustable manually or automatically to accommodate various thicknesses of IG units 15. Other suitable pressing means may be used such as a series of compression rollers of progressively decreasing separation, and presses of the "butterfly" type. The press belts 60 are tilted according to the incline of the conveying surface 125 such that an IG unit 15 will pass along generally the same plane from station H to station P.

Figure 4A:
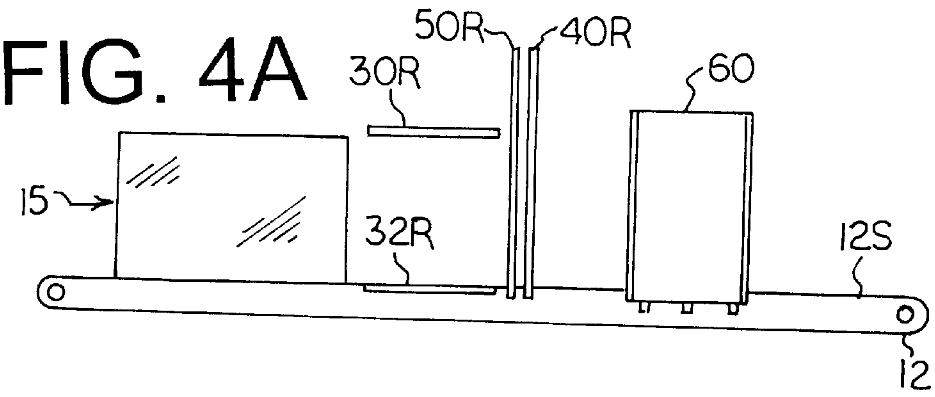
FIGS. 4A to 4G inclusive diagrammatically illustrate the various sequential steps and associated apparatus for the heat sealing of an IG unit.

FIGS. 4A through 4G show the press apparatus in operation. Referring to FIG. 4A, an IG unit 15 is advanced by the conveyor 12 to the station H. If the press apparatus is part of an automatic line, the IG unit is advanced to the station H from a previous station on the line such as an automatic spacer application station. The horizontal heater housings 30L,30R and 32L, 32R are positioned such that the spacer segments 11 along the upper and lower edges of the IG unit 15 will be adjacent the horizontal heater means 28 in housings 30L,30R and 32L, 32R which are activated in the housings 30 and 32 as the IG unit 15 is advanced to the position shown in FIG. 4B. Vertical housings 40L,40R and 50L,50R are in the home positions out of the path of the advancing IG unit.

Figure 4B:
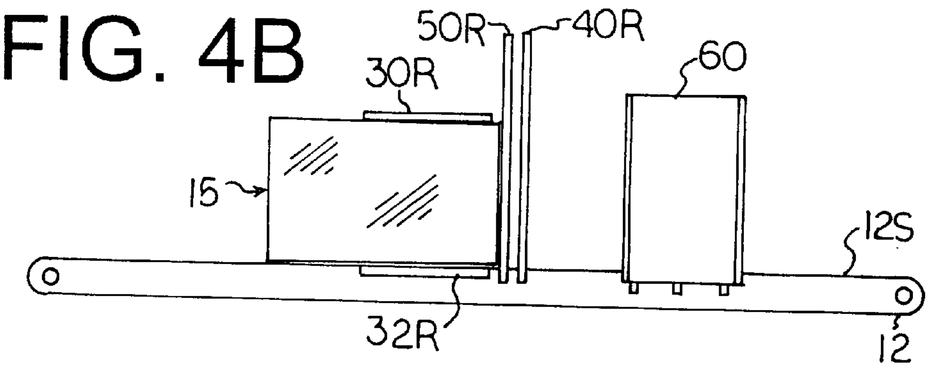

As shown in FIG. 4B, the IG unit 15 is resting on the conveyor 12 tilted to one side of the conveyor 12 and supported laterally by the guide rollers 130 and 132. Leading vertical housings 40L,40R are in the home position adjacent the spacer 11 along the leading edge of the IG unit 15. Trailing vertical housings 50L,50R are in the home position adjacent leading vertical housings 40L and 40R. The energy generating means 28 in housings 30L,30R, 32L,32R and 40L,40R are activated to heat the adjacent spacer 11.

Figure 4C:
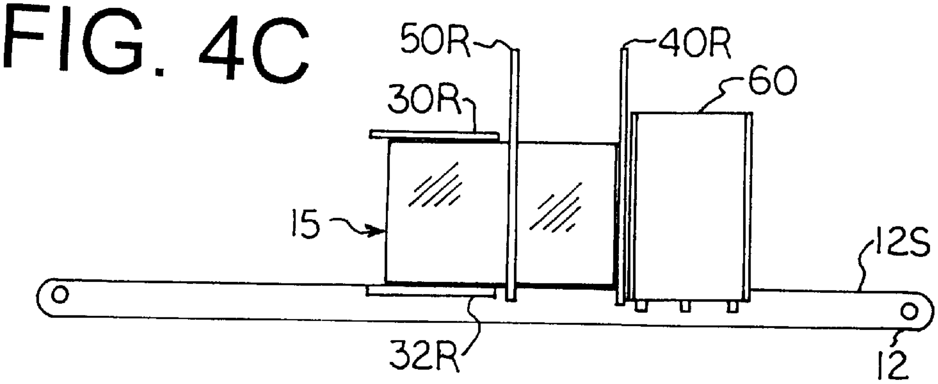

As shown in FIG. 4C, leading vertical housings 40L,40R are in the end position having traveled with the leading edge of the IG unit 15 and upon reaching the end position, have been deactivated to prevent heating of the IG unit 15 in zones without spacer 11 as it advances past the housings 40L,40R. The heater means 28 in housings 30L,30R and 32L,32R are still activated.

Figure 4D:
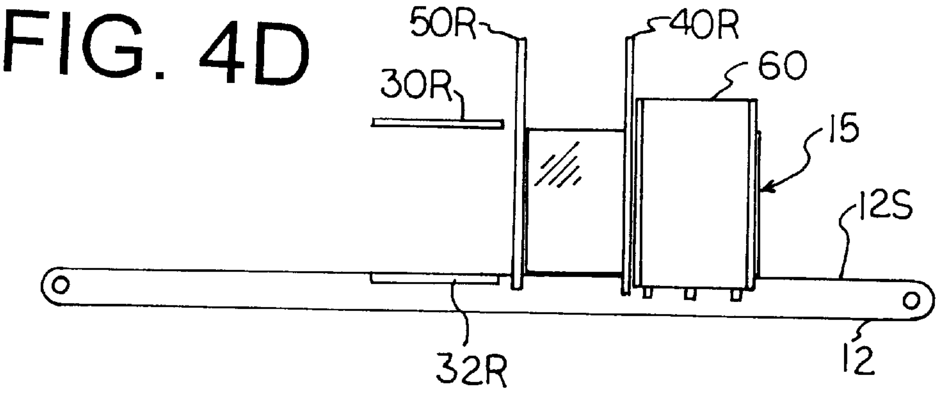

As shown in FIG. 4D, the leading edge of the IG unit 15 has advanced beyond the leading vertical housing 40L,40R and into the station P. The trailing edge of the IG unit 15 has cleared the housings 30L,30R and 32L,32R and the energy generating means 28 therein have been deactivated. The trailing edge of the IG unit is now adjacent the home position of the trailing vertical housings 50L,50R and the heater means 28 therein are activated.

Figure 4E:
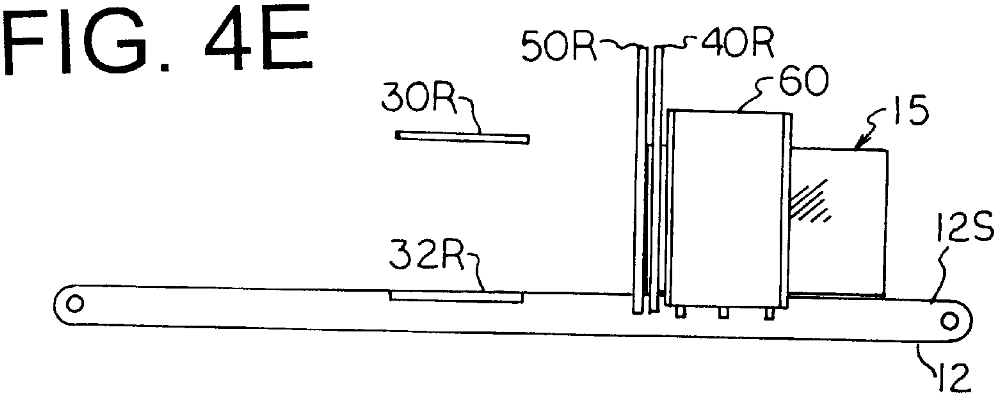

As shown in FIG. 4E, the trailing vertical housing is in the end position having traveled with the trailing edge of the IG unit 15 as it advanced and upon reaching the end position, has been deactivated. Almost the entire length of the IG unit 15 is now with station P where the IG unit 15 is being progressively pressed together to bond the spacer 11 to the substrates 13 to form a sealed the IG unit.

Figure 4F:
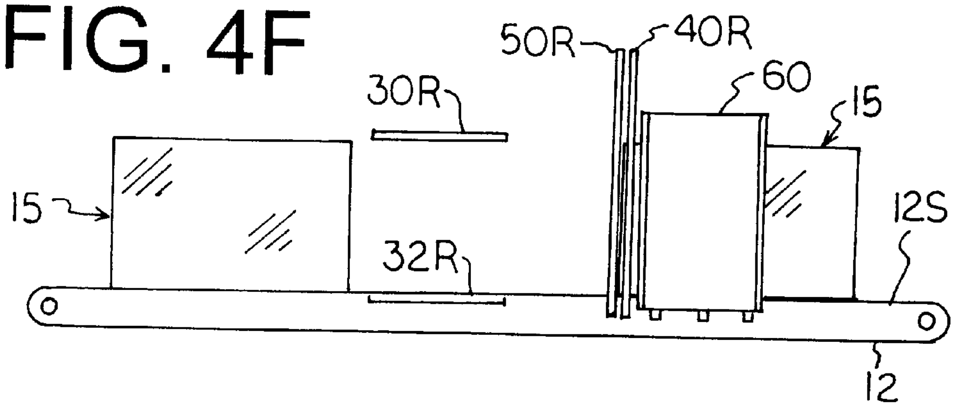

As shown in FIG. 4F, the IG unit 15 has cleared the station P and a subsequent IG unit 15 is advancing into the station H.

Figure 4G:
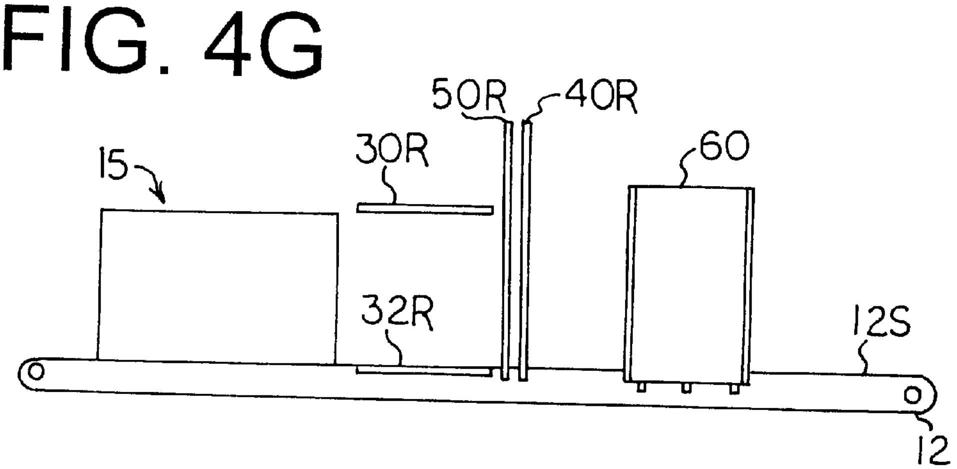
Figure 5:
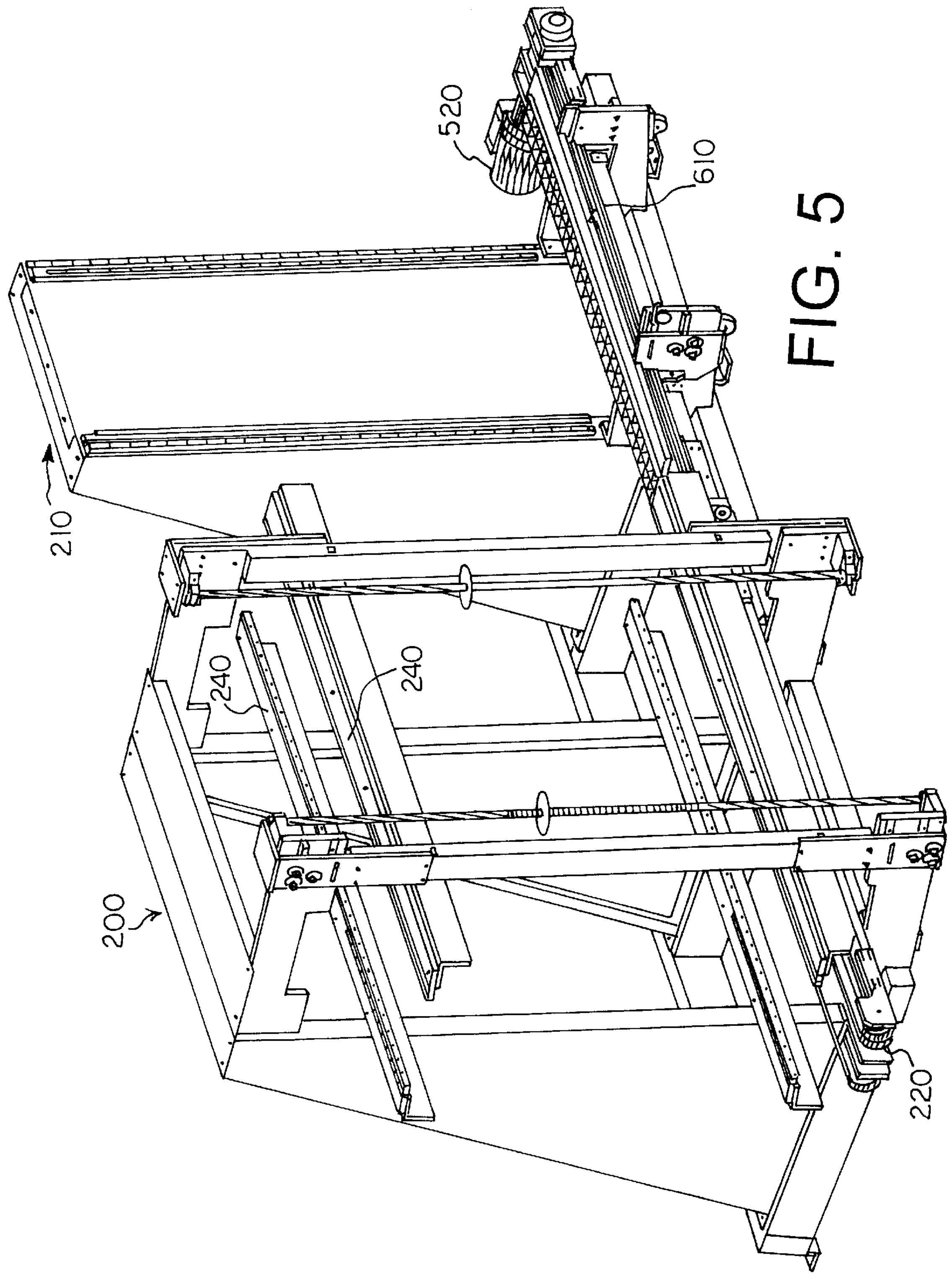
FIG. 5 is a perspective view of a portion of another apparatus with certain components removed in accordance with the present invention.

As shown in FIG. 4G, the vertical housings 40L,40R and 50L,50R have returned to their respective home positions and the heating means in housings 30 and 32 are activated to recommence the cycle.

Referring to FIGS. 5 to 12 in another embodiment of the present invention, the press apparatus includes a vertical energy applying and pressing station shown generally as 200 and a horizontal energy applying and pressing station shown generally as 210.

Vertical Station 200

An IG unit to be sealed advances on conveyor 220 to the vertical station 200. The vertical station includes two vertical heating and pressing assemblies 230 and 232. The assembly 230 is the trailing edge assembly, while the assembly 232 is the leading edge assembly. The heating and pressing assemblies 230 and 232 are each supported and guided by upper and lower rails 240 by means of upper and lower blocks 250 which slide along the top edge of each rail 240. The rails 240 are shown in greater detail in FIG. 8. The rail 240 has an inside edge 260 which is tapered in profile. The surface 260 is furthest from the outer edge 280 in the mid section of the rail 240 and closest to outer edge 280 at the end sections. The taper is achieved by slots 300 which permits the surface 260 to be tapered toward the outer edge 280.

Figure 7:
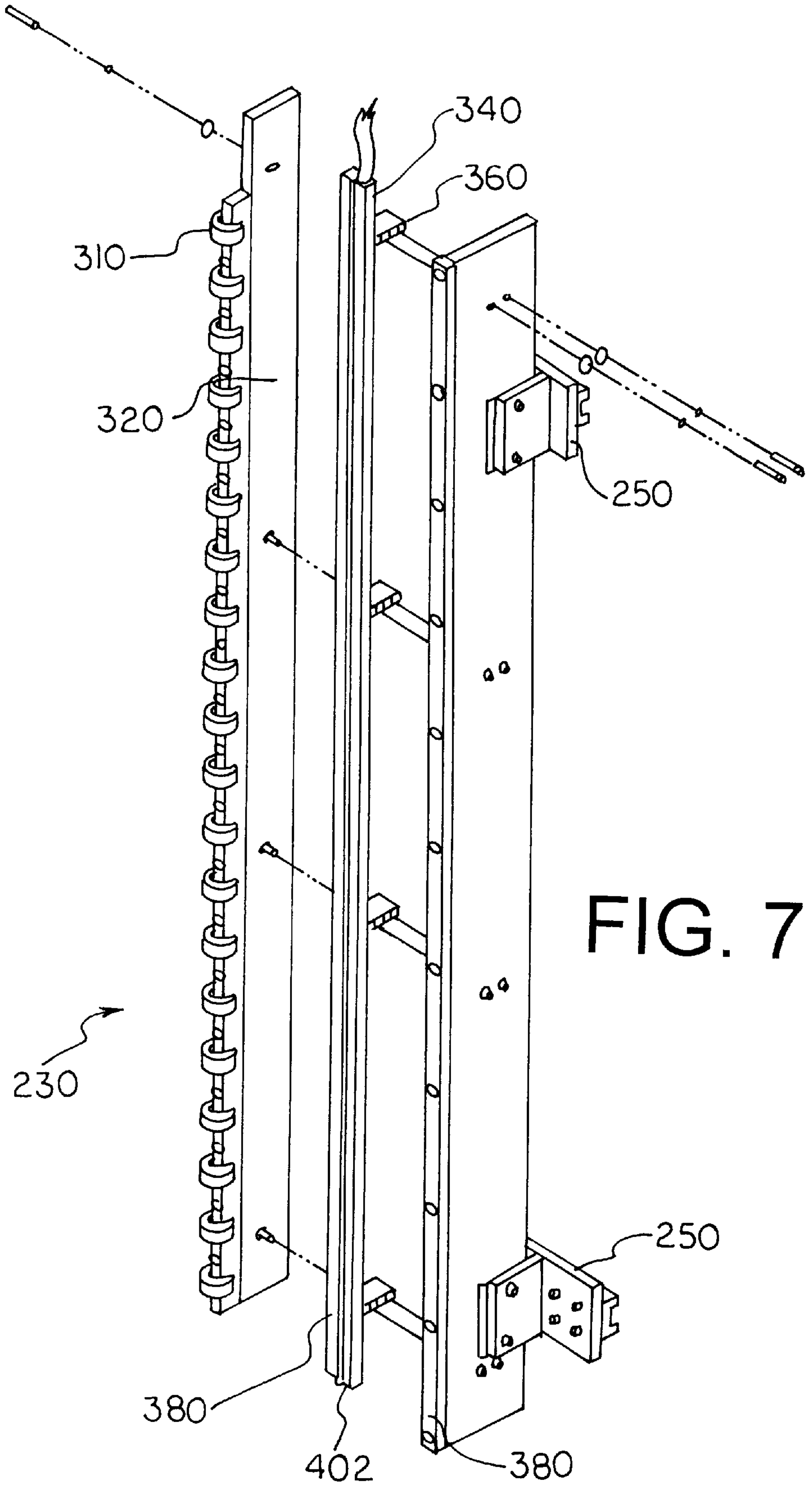
FIG. 7 is a partially exploded view of a vertical heating and pressing assembly of FIG. 6.
Figure 8:
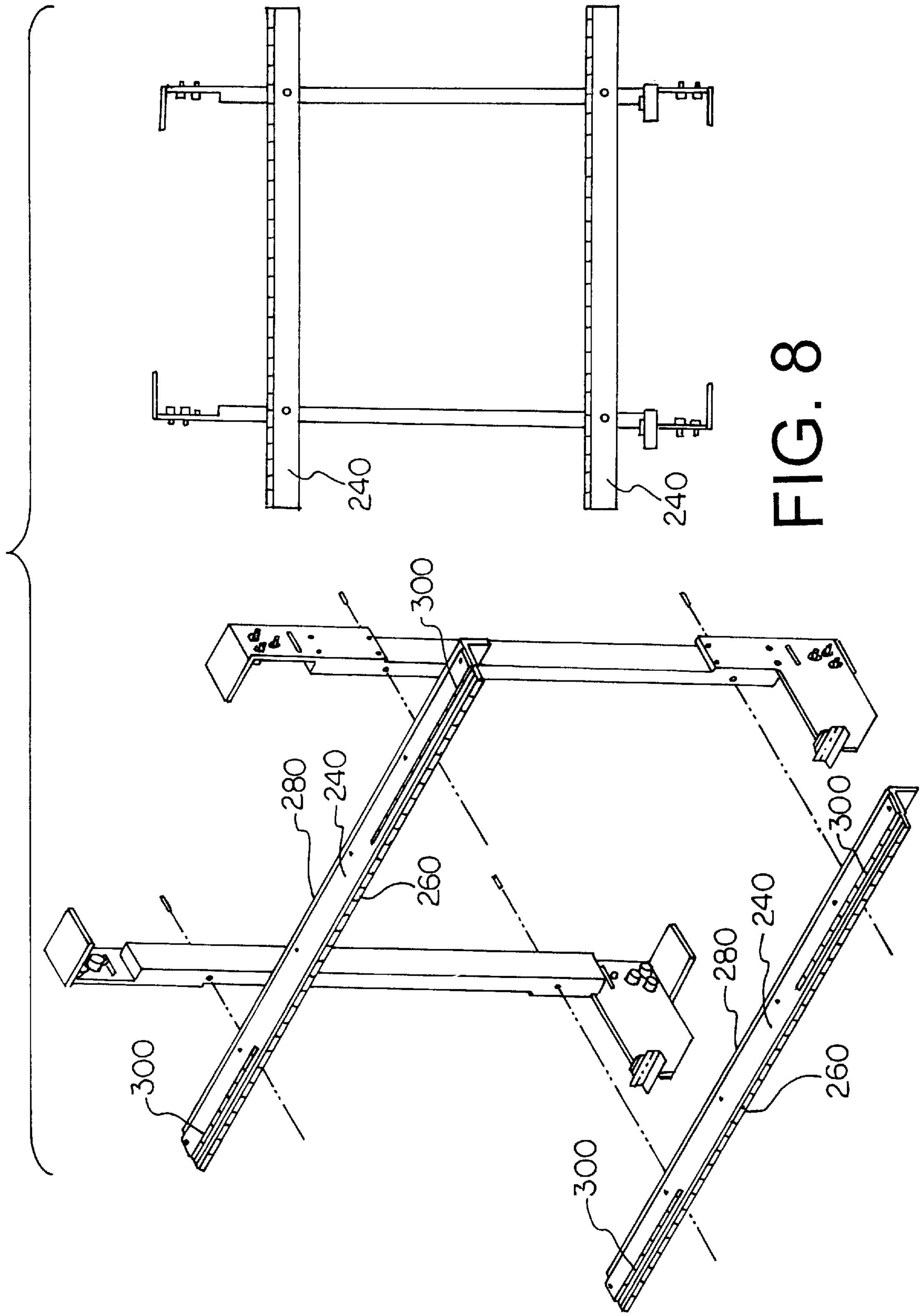
FIG. 8 is a partially exploded view of the rails of the vertical station of the apparatus of FIG. 6.

Referring to FIG. 7, each vertical heating and pressing assembly 230 and 232 includes a set of guide rollers 310 mounted on a support 320 for guiding the IG assembly. The support 320 is attached to main plate 340 with spacer blocks 360. The main plate 340 includes a pressing surface 380 which contacts the glass of the IG unit. The pressing surface 380 is a heat resistant material such as phenolic fiber. Heating elements 402 are mounted between the support 320 and main plate 340. The heating element 402 can be the energy generating means 28 as previously described.

Figure 6:
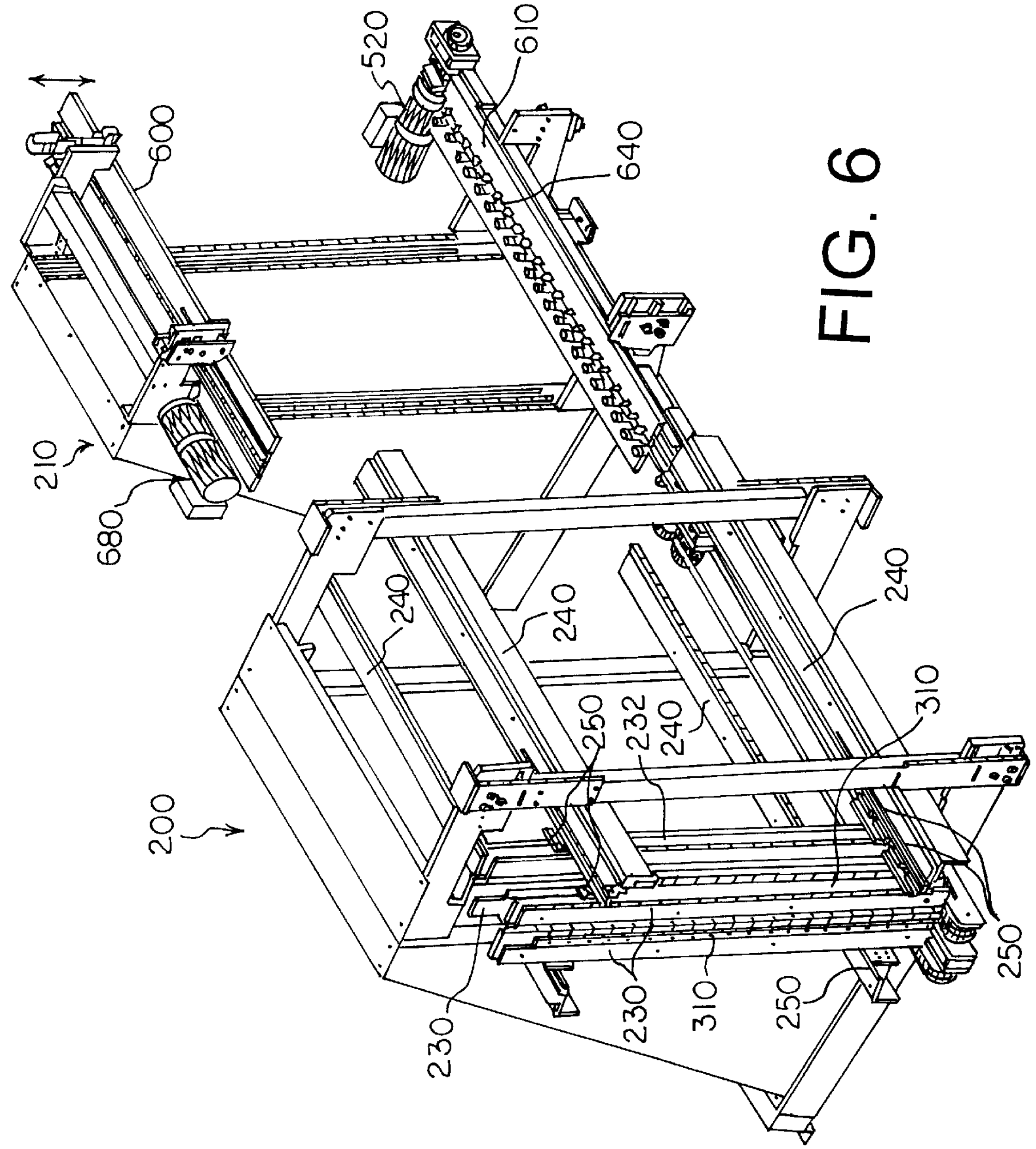
FIG. 6 is a perspective view of the apparatus of FIG. 5 with the vertical heating and pressing assemblies shown.

The assemblies 230 and 232 are shown in their respective home positions in FIG. 6. The assemblies 230 and 232 are mounted on the rails 240 such that the pressing surfaces 380 are opposed to each other.

Figure 10:
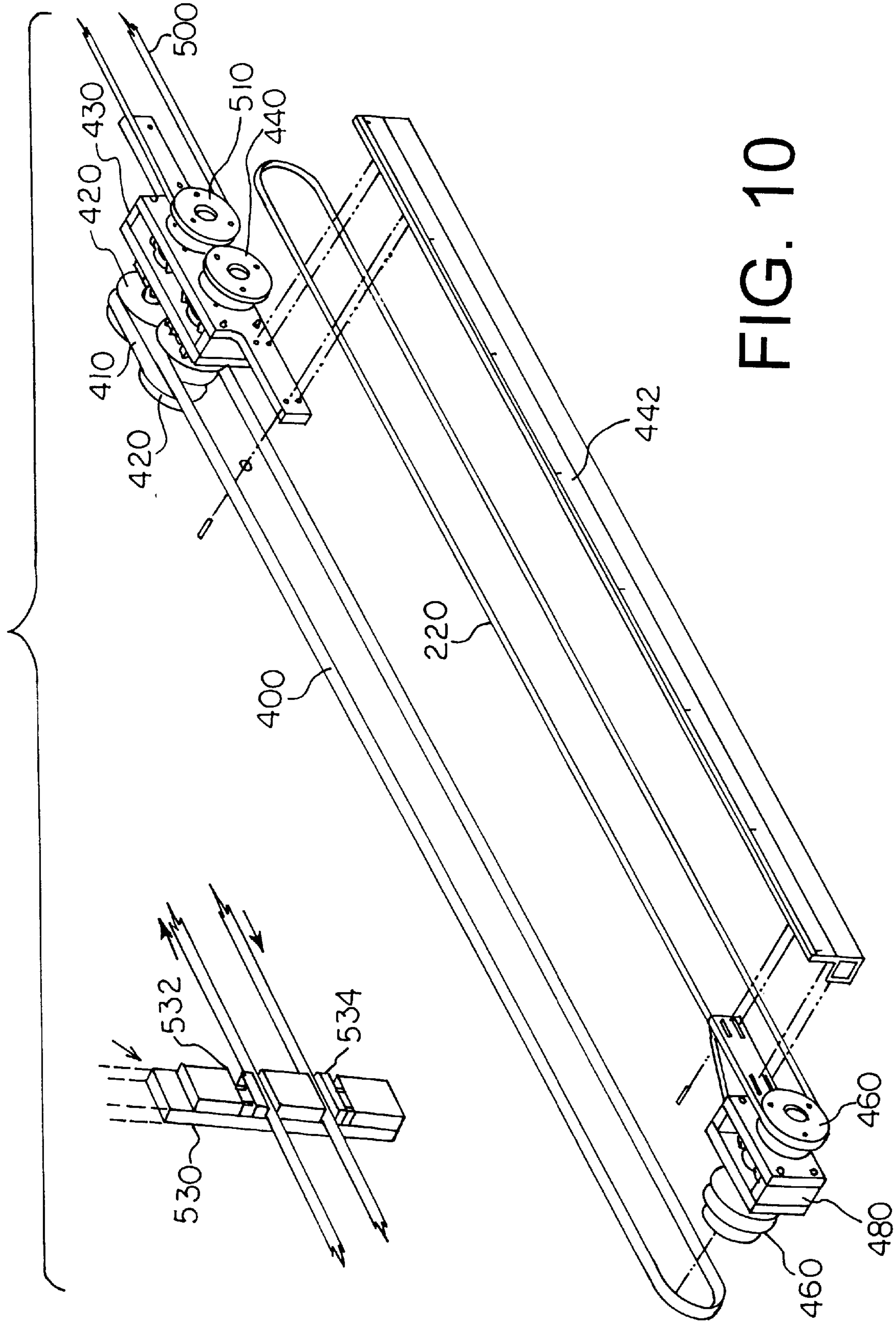
FIG. 10 is a perspective view of the conveyor system of the apparatus of FIG. 6.
Figure 11:
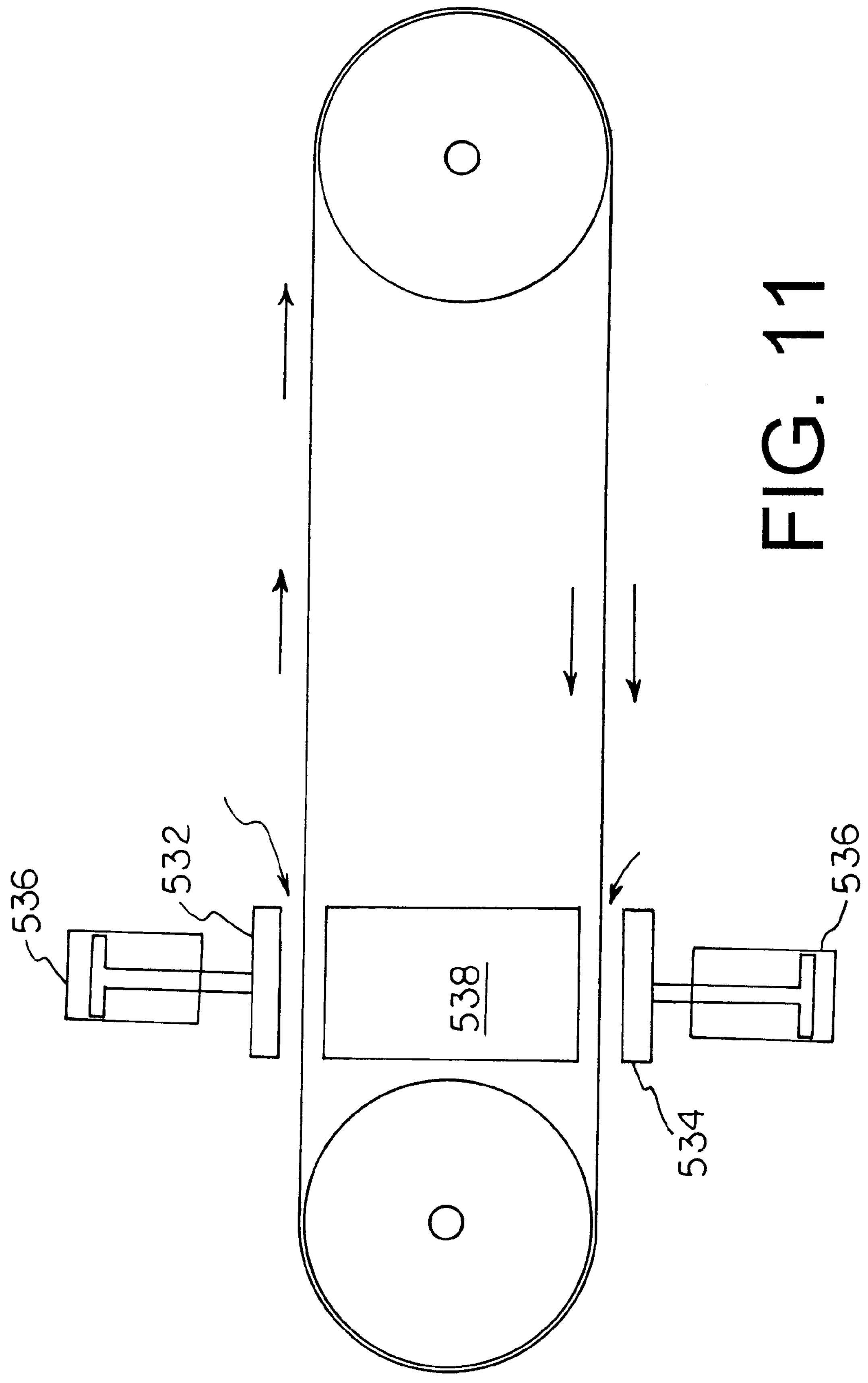
FIG. 11 is a side view of the clamping system of the vertical heating and pressing assemblies of FIG. 6.
Figure 12:
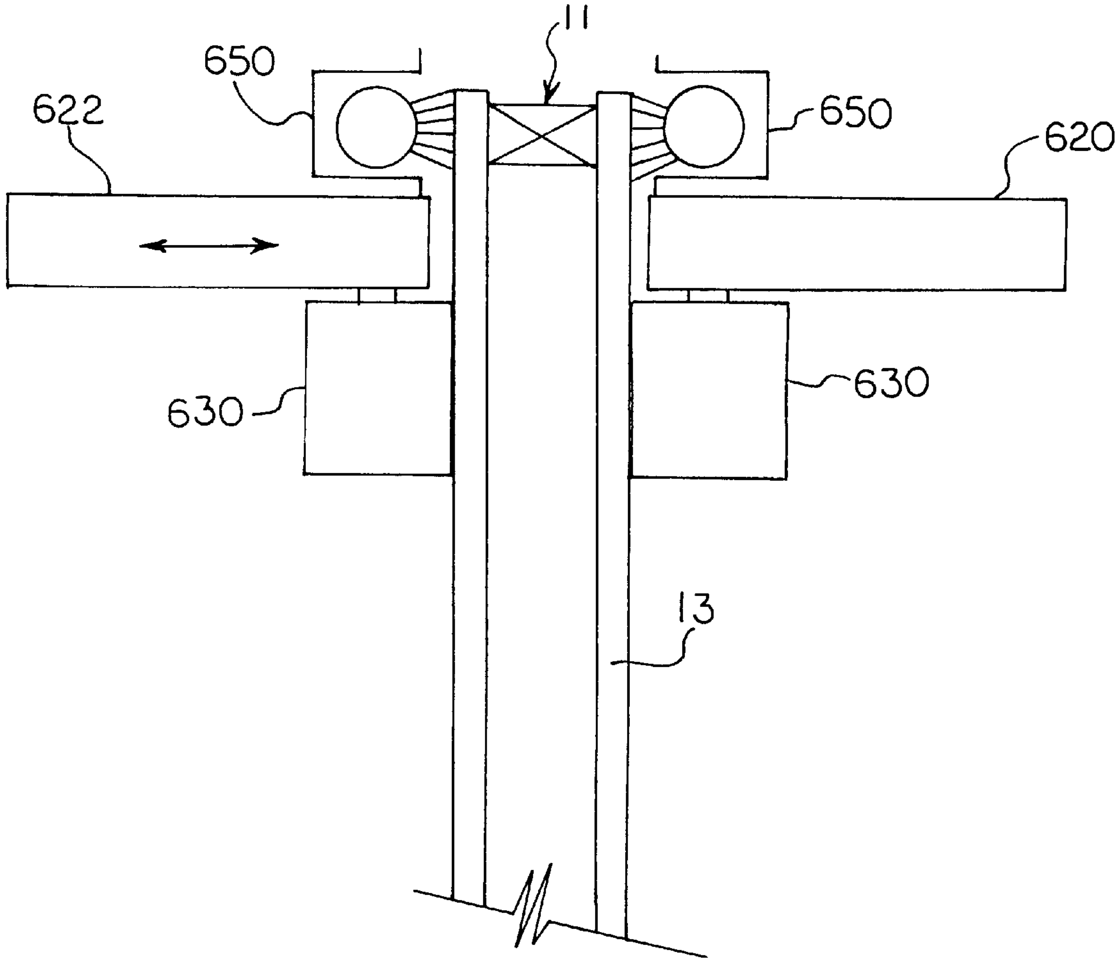
FIG. 12 is an end view from the exit end of the horizontal heating and pressing assembly of FIG. 6.

The separation of the surfaces 380 must be sufficient to permit the width of the assembly to pass therebetween without being significantly pressed. The assemblies 230 and 232 move along the rails between their home position and the other end of the rails near the horizontal station 210. As the assemblies 230 and 232 move toward the other end of the rails, the separation between the pressing surfaces 380 progressively decreases until the mid section of the rails 240 is reached, after which point the separation increases until the separation is once again such that there is no significant pressure on the IG unit. The movement of the assemblies 230 and 232 are timed with the conveyor 220 such that the assemblies 230 and 232 advance together with an advancing IG unit. The timing means for the conveyor and assemblies 230 and 232 is shown in FIG. 10. Timing belts 400 and 410 rotate around pulleys 420 on a middle pulley assembly 430.

The conveyor 220 likewise rotates around pulley 440 of middle pulley assembly 430 and guided by guide assembly 442. The belts 400 and 220 are at their other ends, turn around pulleys 460 of the front pulley assembly 480. Both belts 400 and 220 are driven by belt 500 rotating around drive pulley 510. Belt 500 is driven by motor 520 at its other end. Motion is transferred from the motor 520 via belt 500 to drive pulley 510 and corresponding pulley 420, and then to belt 400 via timing belt 410.

Conventional motion sensors (not shown) sense the position of an incoming IG unit and in turn control grippers 530 which clamp the advancing IG unit to advance it toward the horizontal station 210. The clamping operation performed by the four grippers 530 is synchronized to grip the IG unit such that it is advanced together with the assemblies 230 and 232.

Each gripper 530 has an upper clamp 532 and lower clamp 534 which are actuated by air cylinders 536. A gripper 530 is connected to each assembly 230 and 232. With the belt 400 running, the assemblies 230 and 232 are advanced by actuating the cylinder 536 of upper clamp 532 to press upper clamp 532 against anvil 538. Similarly, lower clamp 534 is actuated to return the assemblies 230 and 232 to the home position.

Referring to FIG. 6, in operation, an IG unit to be sealed such as that described previously as IG unit 15 is advanced by conveying means 220 to the assemblies 230 and 232 shown in the home position. The IG unit passes through the separation between the pressing surfaces 380 of first the trailing assembly 230 and then the leading assembly 232, at which point the upper clamps 532 of the grippers 530 of the leading assembly 232 are actuated to clamp the assembly 232 to the belt 400. The assembly 232 now moves with the belt 400 and in turn is synchronized with the advancing movement of the IG unit being carried by conveyor belt 220. The assembly 232 is timed by conventional sensors (now shown) to be clamped to belt 400 when the spacer 11 is adjacent the heating element 402.

As the assembly 232 advances toward horizontal station 210, the separation between the pressing surfaces 380 of the assembly 232 diminishes which in turn progressively increases the pressure being applied to the substrates 13 to press them together. The heating element 402 is activated at this time to heat the substrates 13 adjacent the area where the vertical sections of the spacer 11 are located as the spacer 11 is being squeezed by the substrates 13. This heats the outer surfaces of the spacer 11 which contacts the substrates 13. Heating continues until the maximum pressing force is achieved around the mid point position of the rails 240 at which time the heating element 402 is switched off. As the IG unit 15 advances beyond the midpoint of station 200, the separation of the pressing surfaces 380 increases until the substrates 13 are no longer being pressed together.

While the leading assembly 232 is advancing, the trailing edge of the IG unit 15 will be moving though the trailing assembly 230. Once sensors (not shown) indicate that the trailing edge of the IG unit is passing through the trailing assembly 230, the upper clamps 532 of the grippers 530 of the trailing assembly 230 are actuated to clamp the assembly 230 to the belt 400. The trailing assembly 230 then moves with the trailing edge of the IG unit 15 in the same manner as that described above with respect to the leading edge. The trailing vertical segments of the spacer 11 are also similarly pressed and heated.

It will be appreciated that the heating element 402 can be switched on at various points during the advancing of the assemblies 230 and 232 to achieve various heating and pressing sequences, such as initial pressing of the substrates 13 and spacer 11 followed by simultaneous pressing and heating as described above. An alternative sequence is to begin heating immediately followed by pressing. It has been found that simultaneously pressing together of the substrates against the spacer and heating yields a good bond between the spacer and the substrates.

Horizontal Station 210

As the IG unit being sealed exits the vertical pressing station, it enters the horizontal pressing and heating station 210. The station 210 includes upper and lower horizontal heating and pressing assemblies 600 and 610.

Figure 9:
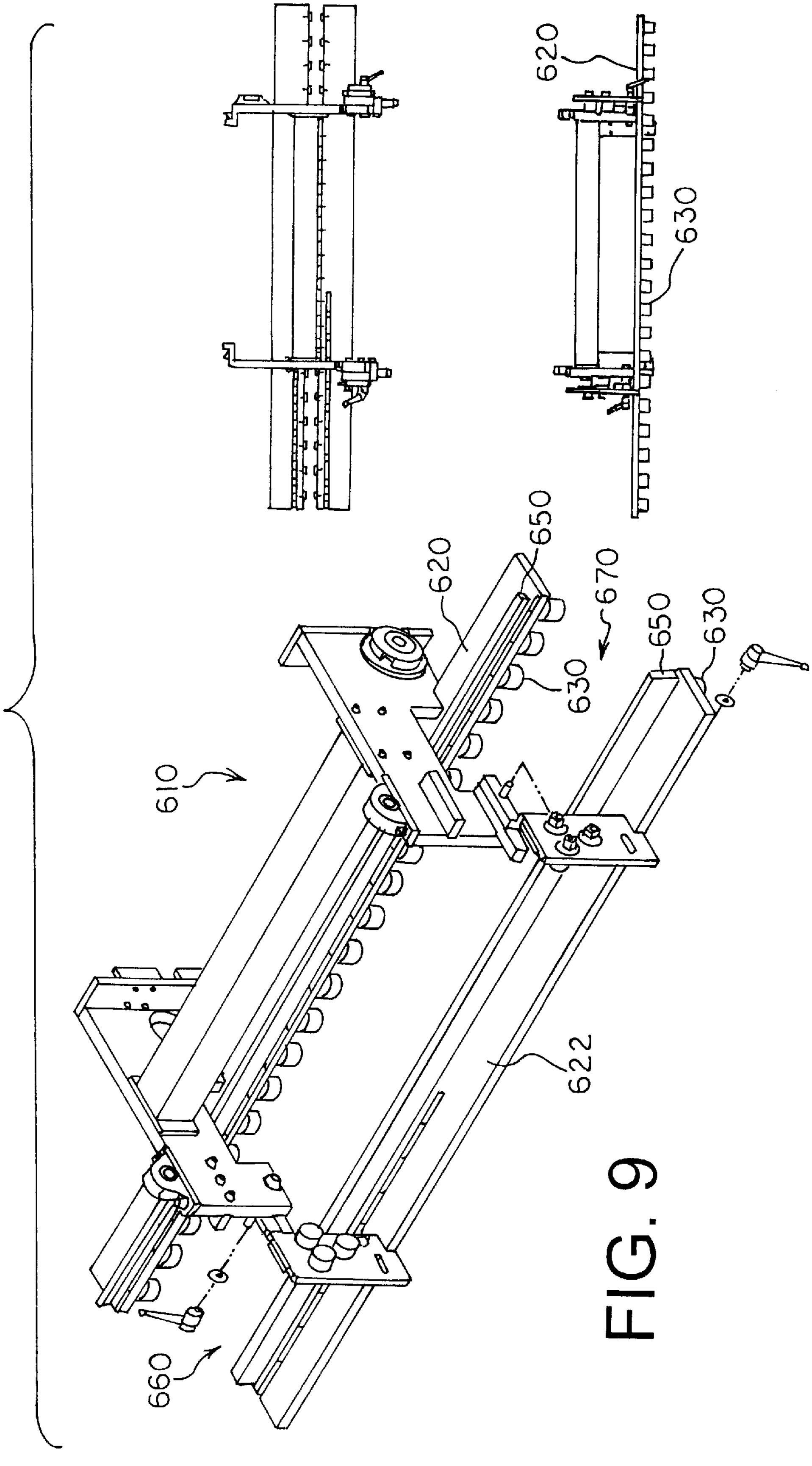
FIG. 9 is a partially exploded perspective view of a horizontal heating and pressing assembly of the apparatus of FIG. 6.

Referring to FIG. 9, the upper assembly 600 includes two horizontal support plates 620 and 622, below which are attached a linear array of pressing rollers 630 for guiding IG units. The plate 620 is fixed while the plate 622 is movable towards and away from the plate 620 to accommodate different thicknesses of IG units. A heating element 650 is mounted on each plate 620 and 622.

The assembly 600 includes opposed arrays of pressing rollers 630. The separation of the guide rollers 630 is greatest at the entry end of the assembly 610 shown generally at 660, and tapers to a narrower separation at the exit end shown generally at 670. The heating elements 650 follow the same tapering path as the pressing rollers 630. The heating elements 650 heat the substrates 13 near the top edge of the IG unit adjacent the location of the spacer. Energy is transferred through the substrates 13 to heat the outer surfaces of the spacer 11 where it contacts the substrates 13.

At the entry end 660, the separation of the pressing rollers 630 permits passage of the top section of an IG unit without significantly pressing it together. As an IG unit proceeds towards the exit end 670, it is progressively pressed together by the pressing rollers 630.

The lower heating and pressing assembly 610 is identical to the upper assembly 600 except it is mounted inverted with respect to assembly 600. The pressing rollers 630 are above the plates 620 and 622 and the heating elements (not shown) are below the rollers 630.

The separation between the assemblies 600 and 610 can be adjusted to accommodate different sizes of IG units by raising or lowering the upper assembly 600 by motor 680 and other suitable means. The pressing rollers 630 on the assemblies 600 and 610 are inclined downwardly by approximately 3° toward the exit end 670. This imparts downward pressure on an IG unit to press it onto the conveyor 220 to advance it. The conveyor belt 220 passes below the lower assembly 610.

In operation, as suitable conventional motion sensors (not shown) detect the IG unit 15 entering the station 210, the heating element 650 in each assembly 600 and 610 is activated to heat the substrates 13 adjacent to the upper and lower horizontal sections of the spacer 11. As the IG unit 15 advances towards the exit end 670, significant pressure begins to be applied to the substrates 13 around the midpoint of the station 210. From the mid point, simultaneous heating and pressing occurs. It will be understood that the heating elements 650 can be varied to adjust the amount of heating as well as to vary the timing of the heating with respect to the pressing.

After the IG unit 15 exits the station 210, the sensors and heating element 650 reset for the next IG units to be processed.

As will be understood, various modifications to the present invention can be made including arranging the heater means in a "picture frame" type assembly whereby the entire spacer is heated at one time, or alternatively, using a heater means which travels around the periphery of the IG unit to heat the spacer. A platinum press can also be employed with suitable modifications.

I claim:

1. An apparatus to seal a spacer between a pair of substrates within a generally rectangular insulated glass assembly having side, leading and trailing edge regions, comprising a pair of spaced apart substrates and a bondable spacer therebetween comprising;

support means for supporting an assembly to be sealed;

conveyor means to convey said insulated glass assembly along said support means; and zonal energy applying means to locally apply energy to selected zones of said assembly where said spacer is located without providing direct energy to the balance of said assembly, said zonal energy applying means comprising a first sealing means for simultaneously applying energy and pressure to said leading and trailing edge regions, comprising two pairs of spaced apart opposed members all moveable relative to said support means and a second sealing means for simultaneously applying energy and pressure to the side regions of said insulated glass assembly;

said support means, conveyor means and zonal energy applying means being arranged for carrying out a sequence of steps on an insulated glass assembly being continuously conveyed wherein energy and pressure are applied first to said leading edge region by a first of said pairs of moveable members travelling with said leading edge region while a second of said pairs of moveable members remains stationary, and a second step wherein the second of said pairs of moveable members applies energy and pressure to said assembly while travelling with said trailing edge region.

2. An apparatus according to claim 1, wherein said second sealing means comprises two pairs of spaced apart opposed energy applying assemblies, at least one pair of said spaced apart assemblies adapted to diverge from the other pair of said assemblies, to accommodate different sizes of insulated glass assemblies, and means to effect movement of said at least one pair of assemblies.

3. The apparatus of claim 1 wherein said zonal energy applying means comprises heating means.

4. An apparatus as defined in claim 1 wherein said first and second sealing means are arranged for sequential operation.

* * * * *